United States Patent
Klessig

(10) Patent No.: US 7,712,255 B1
(45) Date of Patent: May 11, 2010

(54) NESTING PLANTER ARRANGEMENT

(76) Inventor: Donald Klessig, 1501 Palos Verdes Dr. North, No. 60, Harbor City, CA (US) 90710

( * ) Notice: Subject to any disclaimer, the term of this patent is extended or adjusted under 35 U.S.C. 154(b) by 417 days.

(21) Appl. No.: 11/985,295

(22) Filed: Nov. 15, 2007

(51) Int. Cl.
*A01G 9/02* (2006.01)

(52) U.S. Cl. .......................................... 47/83

(58) Field of Classification Search ............ 47/83, 47/33, 82, 66.2; 206/514, 505; 220/630, 220/628, 4.27, 4.26
See application file for complete search history.

(56) References Cited

U.S. PATENT DOCUMENTS

| | | | |
|---|---|---|---|
| 197,406 A * | 11/1877 | Reinecke | 47/83 |
| 440,141 A * | 11/1890 | Dearborn | 47/33 |
| 2,803,923 A * | 8/1957 | Pratt | 47/83 |
| 3,137,095 A | 6/1964 | Pearson | |
| 4,250,666 A | 2/1981 | Rakestraw | 47/83 |
| 4,685,246 A | 8/1987 | Fennell | 47/66 |
| 5,136,807 A | 8/1992 | Orlov | 47/83 |
| 5,438,797 A * | 8/1995 | Lendel | 47/82 |
| 5,484,234 A | 1/1996 | Worden | 405/284 |
| 6,612,073 B1 * | 9/2003 | Powell et al. | 47/83 |

* cited by examiner

*Primary Examiner*—Michael R Mansen
*Assistant Examiner*—Monica Williams
(74) *Attorney, Agent, or Firm*—Don Finkelstein

(57) ABSTRACT

A nesting planter arrangement having a plurality of open planting units each of a successive smaller size from the bottom planter unit to the top planter unit and in which each planter unit other than the base planter unit rests on a portion of the planter unit below it so that it projects above the planter unit upon which it rests in the planting position and the arrangement may be inverted to be in the storage position so that the plurality of planting units are nested together in a smaller height than in the planting position.

18 Claims, 5 Drawing Sheets

NESTING PLANTER ARRANGEMENT

BACKGROUND OF THE INVENTION

1. Field of the Invention

This invention relates to the planter art useful for planting and growing any desired type of plant and more particularly to a planter arrangement in which a plurality of individual planting units have an extended planting position and a compressed storage position.

2. Description of the Prior Art

With the increase in population, particularly in urban areas, there has been an attendant decrease in ground space available to each person. This effect has been very pronounced with the increase of the number of persons living in apartments or condominiums. However, many people, home owners and apartment/condominium dwellers desire to grow plants for both useful products such as herbs to decorative products such as flowers. The decreased ground space available for the growing of plants has often resulted in the lack of outdoor space for such planting.

To overcome the lack of basically outdoor horizontal space for growing plants, various arrangements of vertically aligned, multiple planter arrangements have heretofore been designed for use. In many of these arrangements, each of the planters is complete with sides and bottoms to define a planting volume therein. Such arrangements have not proven to be satisfactory since the volume occupied by the multiple planters differed little from the volume occupied when the arrangements were shipped from the manufacturer to the seller and then stored for inventory and display by the seller. Similarly, even for the ultimate user of the arrangement the large volume occupied by the arrangement when not in use by the user made such multiple planting arrangements unsatisfactory. Further, the amount of planting material such as soil was generally limited to the size of the individual planters.

Thus, there has long been a need for a compact, multiple level planting arrangement in which the volume occupied by the arrangement when in a storage condition is small in comparison to the volume occupied when in the planting position.

Accordingly, it is an object of the present invention to provide an improved multiple level planting arrangement.

It is another object of the present invention to provide an improved multiple level planting arrangement that has a comparatively large volume of planting material to support a large volume of plants.

It is another object of the present invention to provide a multiple level planting arrangement which has a large, extended planting position and may be inverted to provide a comparatively small compact position for storage and shipping.

SUMMARY OF THE INVENTION

The above and other objects of the present invention are achieved, in a preferred embodiment thereof in a multiple level planting arrangement having a preselected number of planting units. For example, there may be provided four planting units: the base unit and three upper units but the present invention is adaptable to any number of planting units—greater or less than four. Each of the planting units when in the planting position thereof is in deceasing size from the largest planting unit at the bottom to the smallest planting unit at the top. The arrangement has a storage position in which the planting units are "nested" together with each of the units fitting inside the next larger size unit beneath it, and a planting position where each planting unit rests on the top of the next larger size planting unit beneath it. Each planting unit has side members defining a hollow planting volume. Each of the side members of each planting unit has an inside surface, an outside surface, a top surface, a bottom surface and opposed end surfaces. The "top surface" and "bottom surface" refer to the orientation of the nested planting arrangement in the planting position thereof. The side members are joined at the end surfaces thereof to form a joint therebetween with the inside surfaces of the side members of the planting units defining the planting volume for the particular planting unit. The top surface and the bottom surface of each planing unit are substantially coplanar. In the storage position, the planting units are inverted.

The side members of each of the planting units may be joined together to define any desired geometric configuration: square, rectangular, octagonal, etc. The base planting unit also has a movable bottom member which is free to move from a position adjacent the top surfaces of the side members of the base planting unit in the storage position to a position adjacent the bottom surfaces of the side members of the base planting unit in the planting position.

Each planting unit is preferably reinforced with a corner brace lodged in the joint formed at the joined edges of the side members in regions adjacent the bottom surfaces of the side members and, except for the top unit, with a cross brace at each joint formed at the joined edges of the side members in regions adjacent the bottom surfaces of the side members. A portion of the corner brace of each planting unit overlies at least a portion of the cross braces of the planting unit below it in the planting position.

In the planter position, a portion of the bottom surface of the side members of each unit rests on the top surface of the cross braces of the next larger planting unit beneath it. In the nesting or storage position the units are inverted and a portion of the top surface of each side member of each of the planter units above the base unit rests on the lower surface of the cross braces.

When in the planting position, planting material is placed in the base planting unit on the bottom member up to the top of the side members. The next planting unit is then placed on the cross braces of the base planting unit and is filled with planting material up to the top of its side members. The next planting unit is then placed on the cross braces of the unit below it and is then filled with planting material up to the top edges of the side members. this process is repeated for each of the successively smaller planting units until the top most unit is placed on the cross braces of the next larger planting unit below it and then filled with planting material. Plants then may be planted in the whole area defined by the top unit and in the area adjacent the side members of each of the planting units and the side members of the planting unit below it.

Aligned holes in the corner braces and cross braces allow insertion of a pin therethrough to aid in keeping the units aligned when in the planting position.

The open bottom of each of the planting units above the base planting unit allows for a greater amount of planting material to be placed in the arrangement from the top surface of the side members of the top planting unit down to the movable bottom member of the base planting unit to allow more room for the roots of plants to grow than would be available if each of the planting units had a bottom member.

The movable bottom member is utilized in preferred embodiments of the present invention so that the arrangement may be placed in any desired location above any type of surface.

BRIEF DESCRIPTION OF THE DRAWING

The above and other embodiments of the present invention may be more fully understood from the following detailed description taken together with the accompanying drawing wherein similar reference characters refer to similar elements throughout and in which.

DESCRIPTION OF THE PREFERRED EMBODIMENTS

Figure 1:
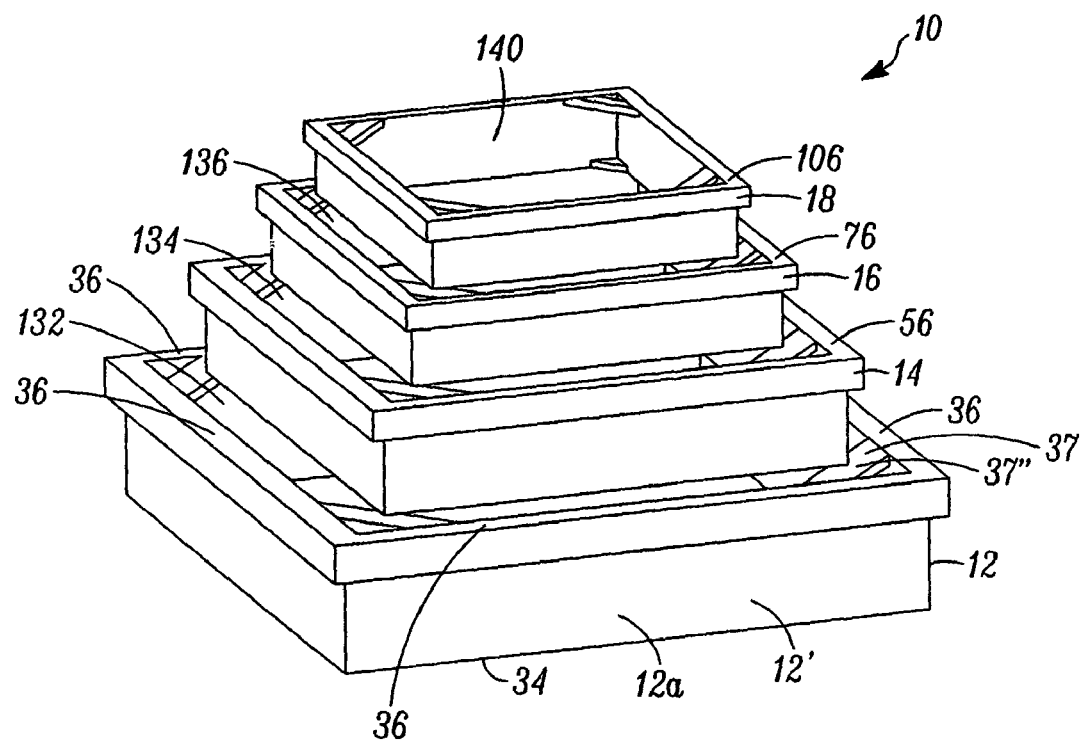
FIG. 1 illustrates a perspective view of a preferred embodiment of the present invention having a base planting unit, a first intermediate planting unit, a second intermediate planting unit and a top planting unit of a planting arrangement according to the principles of the present invention in the planting position thereof.
Figure 2:
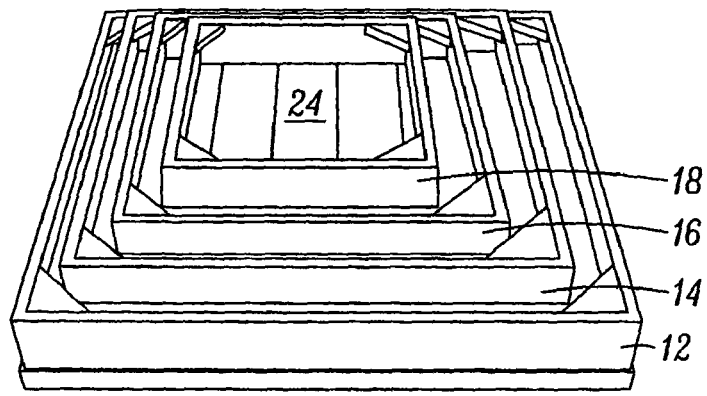
FIG. 2 illustrates a perspective view of a preferred embodiment of the present invention having a base planting unit, a first intermediate planting unit, a second intermediate planting unit and a top planting unit of a planting arrangement according to the principles of the present invention in the storage position thereof.

Referring now to the drawing, there is illustrated in FIG. 1 a preferred embodiment, generally designated 10, of the planting arrangement according to the principles of the present invention, in the planting position thereof and FIG. 2 illustrates the planting arrangement of the embodiment 10 in the storage position thereof. In the embodiment 10 there is provided a base unit 12, a first intermediate planting unit 14, a second intermediate planting unit 16 and a top planting unit 18. In the embodiment 10, each of the base unit 12, first intermediate planting unit 14, second intermediate planting unit 16 and top planting unit 18 have a peripheral configuration which is square. In other embodiments of the present invention, as described below, the peripheral configuration of each of the base unit 12, first intermediate planting unit 14, second intermediate planting unit 16 and top planting unit 18 may be circular, hexagonal, oval or any other regular or irregular polygon.

As shown in FIG. 1, each of the base unit 12, first intermediate planting unit 14, second intermediate planting unit 16 and top planting unit 18 have substantially the same peripheral configuration. However, in other embodiments of the present invention the various units of the present invention may have different peripheral configurations. Also, the number of units comprising the present invention may be four as shown in embodiment 10 or any other desired number in which there is a base unit as described herein and at least one additional unit such as the first intermediate unit 14.

Referring now to FIG. 3 which is an exploded view of the embodiment 10 in the storage position, base planter unit 12 has four base planting unit side members 12a, 12b, 12c and 12d coupled together and each side member 12a, 12b, 12c and 12d have outer surfaces such as 30, inner surfaces 32, bottom surfaces such as 34 and top surfaces 36 (FIG. 1). The inner surfaces such as 32 define a base planter unit open planting volume 20 (FIG. 4). The outer surfaces such as 30 define a first preselected geometric base planter unit peripheral configuration which, for embodiment 10, is square. However, other preselected geometric base planter unit peripheral configurations may be selected for other desired applications. The base planter unit 12 also has a movable bottom member 24 which is movable between a position adjacent the top surfaces 36 as shown in FIG. 3 and resting on the lower surface 37' of cross braces 37 for the storage position thereof and adjacent the bottom surfaces 34 and resting on the upper surface 40' of corner braces 40 in the planting position thereof. The bottom member 24 may be a unitary structure or may be comprised of a plurality of planks as shown on FIG. 3. Additionally, if desired reinforcing members 24' may be provided on the bottom surface 24a of the bottom member 24.

The base planter unit 12 is provided with a plurality of corner braces 40 at the joints between the side members 12a, 12b, 12c and 12d and adjacent the bottom surfaces 34 and each corner braced 40 has upper surface 40' and a lower surface 40". As shown on FIG. 4, the base unit 12 is also provided with a plurality of cross braces 44 adjacent the top surfaces 36 adjacent the corners 48 but spaced therefrom. Each of the corner braces 44 has an upper surface 44' and a lower surface 44". In the planting position as shown on FIGS. 4 and 10, the bottom surface 24a of the bottom member 24 rests on the upper surface 40' of corner braces 40 and on the upper surfaces of reinforcing members 24'. In order to provide additional support for the bottom member 24, in many embodiments of the present invention a support rim 24" extending between the corner braces 40 and reinforcing members 24 and, as shown more clearly in FIG. 10, the bottom surface 24*a* of the bottom member 24 rests on the upper surface 24"*a* of the rim support 24". In the storage position the upper surface 24*b* of bottom member 24 rests on the bottom surface 44" of the cross braces 44.

First intermediate planter unit 14 has four first intermediate planting unit side members 14*a*, 14*b*, 14*c* and 14*d* coupled together and each side member 14*a*, 14*b*, 14*c* and 14*d* have outer surfaces such as 50, inner surfaces 52, bottom surfaces such as 54 and top surfaces 56. The inner surfaces such as 52 define a first intermediate planter unit open planting volume 60 and there is no bottom surface in first intermediate planting unit 14 so that the volume 60 extends from the top surface 56 to the bottom surface 54. The outer surfaces such as 50 define a first preselected geometric first intermediate planter unit peripheral configuration which, for embodiment 10, is square to match the peripheral configuration of the base planter unit 12. In some embodiments, however, a different geometric shape for the first preselected geometric first intermediate planter unit peripheral configuration may be utilized.

The first intermediate planter unit 14 is provided with a plurality of corner braces 60 at the joints between the side members 14*a*, 14*b*, 14*c* and 14*d* and adjacent the bottom surfaces 54 and each corner brace 60 has upper surface 60' and a lower surface 60". The first intermediate planting unit 14 is also provided with a plurality of cross braces 64 adjacent the top surfaces 56 at each corner 58 but spaced therefrom. Each of the corner braces 64 has an upper surface 64' and a lower surface 64".

As described below, in the storage position of embodiment 10, the upper surfaces 56 of the side members 14*a*, 14*b*, 14*c* and 14*d* of first intermediate planting unit 14 rest on the bottom surface 24*a* of bottom member 24 and/or on reinforcing members 24'. In the planting position the lower surfaces 54 of side members 14*a*, 14*b*, 14*c* and 14*d* and the bottom surfaces 60' of corner braces 60 rest on the upper surfaces 44' of cross braces 44 of base planting unit 12. The size of the first intermediate planting unit 14 is selected to be smaller than the size of the base planting unit 12 so that the first intermediate planting unit 14 fits inside the corner a braces 40 of base planting unit 12 in the storage position. The size of the first intermediate planting unit 14 is thereby selected so that in the planting position there is a peripheral planting space between the outer surfaces 50 of side members 14*a*, 14*b*, 14*c* and 14*d* and the inner surfaces 32 of side members 12*a*, 12*b*, 12*c* and 12*d* of base planting unit 12. In the planting position the corner braces 60 of the first intermediate planting unit 14 overlie at least a portion of the corner braces 44 of base planting unit 12.

Second intermediate planter unit 16 has four second intermediate planting unit side members 16*a*, 16*b*, 16*c* and 16*d* coupled together and each side member 16*a*, 16*b*, 16*c* and 16*d* have outer surfaces such as 70, inner surfaces 72, bottom surfaces such as 74 and top surfaces 76. The second intermediate planting unit 16 is constructed generally similar to the construction of first intermediate planting unit 14. The inner surfaces such as 72 define a third intermediate planter unit open planting volume 80 and there is no bottom surface in second intermediate planting unit 16 so that the volume 80 extends from the top surface 76 to the bottom surface 74. The outer surfaces such as 70 define a third preselected geometric second intermediate planter unit peripheral configuration which, for embodiment 10, is square to match the peripheral configuration of the base planter unit 12 and first intermediate planting unit 14. In some embodiments, however, a different geometric shape for the second preselected geometric second intermediate planter unit peripheral configuration may be utilized.

The second intermediate planter unit 14 is provided with a plurality of corner braces 90 at the corner joints 78 between the side members 16*a*, 16*b*, 16*c* and 16*d* and adjacent the lower surfaces 74 and each corner brace 90 has upper surface 90' and a lower surface 90". The second intermediate planting unit 14 is also provided with a plurality of cross braces 94 adjacent the top surfaces 76 at each corner 78 but spaced therefrom. Each of the cross braces 94 has an upper surface 94' and a lower surface 94".

As described below, in the storage position of embodiment 10, the top surfaces 76 of the side members 16*a*, 16*b*, 16*c* and 16*d* of second intermediate planting unit 16 rest on the lower surfaces 64" of the cross braces 64 of first intermediate planting unit 14. In the planting position the lower surfaces 74 of side members 16*a*, 16*b*, 16*c* and 16*d* and the bottom surfaces 90' of corner braces 90 rest on the upper surfaces 64' of cross braces 64 of first intermediate planting unit 14. The size of the second intermediate planting unit 16 is selected to be smaller than the size of the first intermediate planting unit 14 so that the second intermediate planting unit 16 fits inside the corner a braces 64 of first intermediate planting unit 14 in the storage position. The size of the second intermediate planting unit 14 is thereby selected so that in the planting position there is a peripheral planting space between the outer surfaces 70 of side members 16*a*, 16*b*, 16*c*, and 16*d* of second intermediate planting unit 16 and the inner surfaces 52 of side members 14*a*, 14*b*, 14*c* and 14*d* of first intermediate planting unit 14. In the planting position the corner braces 90 of the second intermediate planting unit 16 overlie at least a portion of the cross braces 64 of first intermediate planting unit 14.

Top planter unit 18 has four top planting unit side members 18*a*, 18*b*, 18*c* and 18*d* coupled together and each side member 18*a*, 18*b*, 18*c* and 18*d* have outer surfaces such as 100, inner surfaces 102, bottom surfaces such as 104 and top surfaces 106. The top planting unit 18 is constructed generally similar to the construction of first intermediate planting unit 14, second intermediate planting 16 and base planting unit 12. The inner surfaces such as 102 define a fourth intermediate planter unit open planting volume 110 and there is no bottom surface in top planting unit 16 so that the volume 110 extends from the top surface 76 to the bottom surface 74. The outer surfaces such as 100 define a fourth preselected geometric top planter unit peripheral configuration which, for embodiment 10, is square to match the peripheral configuration of the base planter unit 12, first intermediate planting unit 14 and second intermediate planting unit 16. In some embodiments, however, a different geometric shape for the top preselected geometric top planter unit peripheral configuration may be utilized.

The top planter unit 18 is provided with a plurality of corner braces 112 at the corner joints 118 between the side members 18*a*, 18*b*, 18*c* and 18*d* and adjacent the lower surfaces 104 and each corner brace 112 has upper surface 112" and a lower surface 112". If desired for structural integrity purposes to provide a more rigid top planter unit, the top planting unit 18 may be provided with a plurality of cross braces 114 adjacent the top surfaces 104 at each corner 118 but spaced therefrom. If so provided, each of the cross braces 114 has an upper surface 114' and a lower surface 114". However, the corner braces 114 may be omitted as the are not required for support in either the planting position or storage position As described below, in the storage position of embodiment 10, the top surfaces 104 of the side members 18a, 18b, 18c and 18d of top planting unit 18 rest on the lower surfaces 94″ of the cross braces 94 of second intermediate planting unit 16. In the planting position the lower surfaces 106 of side members 18a, 18b, 18c and 18d and the bottom surfaces 112′ of corner braces 112 rest on the upper surfaces 94′ of cross braces 94 of second intermediate planting unit 18. The size of the top planting unit 18 is selected to be smaller than the size of the second intermediate planting unit 16 so that the top planting unit 18 fits inside the corner a braces 90 of first intermediate planting unit 16 in the storage position. The size of the top planting unit 18 is thereby selected so that in the planting position there is a peripheral planting space between the outer surfaces 100 of side members 18a, 18b, 18c, and 18d of top planting unit 18 and the inner surfaces 72 of side members 16a, 16b, 16c and 16d of second intermediate planting unit 16. In the planting position the corner braces 112 of the top planting unit 18 overlie at least a portion of the cross braces 94 of second intermediate planting unit 16.

While the embodiment 10 is depicted with four planting units, the present invention may incorporate more or less than four planting units. In such alternate embodiments, the base planter unit is generally constructed as shown in base planter unit 12 and the upper most planter unit may be constructed as shown for first or second intermediate planting unit 14, 16 or top planter unit 18.

Figure 3B:
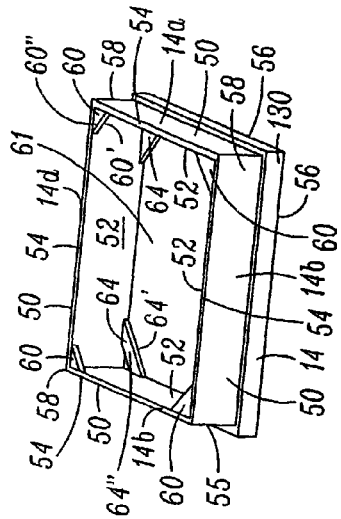
FIG. 3B illustrates an exploded view of a first intermediate planting unit of a planting arrangement according to the principles of the present invention in the storage position thereof.
Figure 3D:
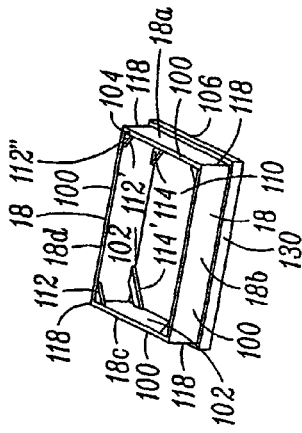
FIG. 3D illustrates exploded view of a top planting unit of a planting arrangement according to the principles of the present invention in the storage position thereof.
Figure 3A:
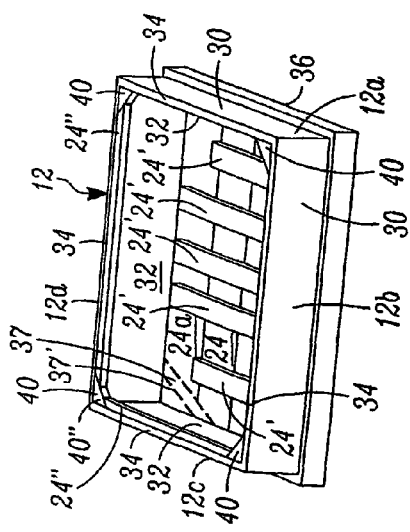
FIG. 3A illustrates an exploded perspective view of the base planting unit of a planting arrangement according to the principles of the present invention in the storage position thereof.
Figure 3C:
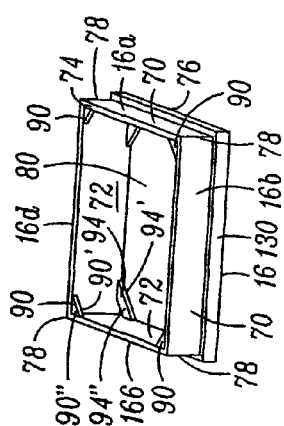
FIG. 3C illustrates an exploded view of a second intermediate planting unit of a planting arrangement according to the principles of the present invention in the storage position thereof.
Figure 4:
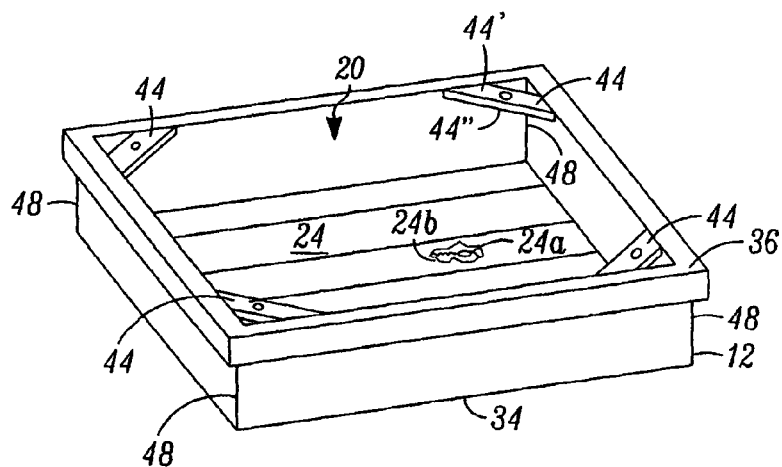
FIG. 4 illustrates a perspective view of a base planting unit of a planting arrangement according to the principles of the present invention in the planting position thereof.

If desired, trim edge pieces 130 such as shown on FIGS. 3A and 3B may be provided on each of the planter units 12, 14, 16 and 18.

Figure 5:
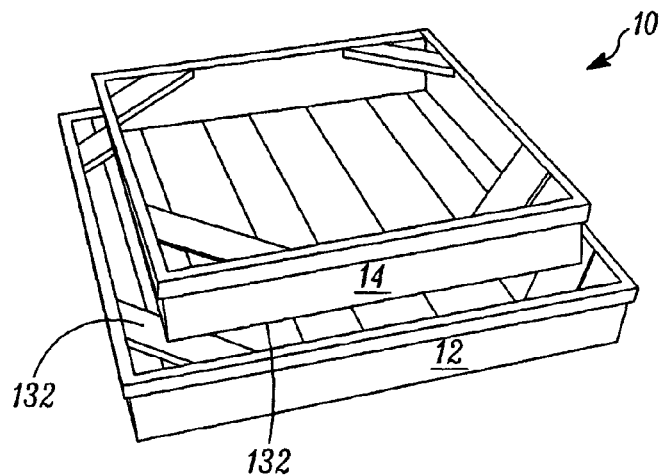
FIG. 5 illustrates a perspective view of a base planing unit and a first intermediate planting unit according to the principles of the present invention in the planting position thereof.

FIG. 5 is a perspective view of the base unit 12 and first intermediate planter unit 14 in the planting position thereof and shows the planting volume 132 therebetween.

Figure 6:
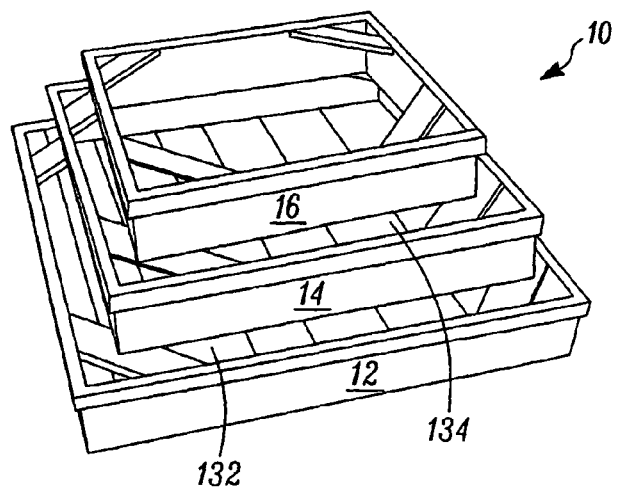
FIG. 6 illustrates a perspective view of a base planing unit, a first intermediate planting unit and a second intermediate planting unit according to the principles of the present invention in the planting position thereof.

FIG. 6 is a perspective view of the base unit 12, first intermediate planter unit 14 and second intermediate planter unit 16 in the planting position thereof and shows the planting volume 132 between base unit 12 and first intermediate planting unit 14 and the planting volume 134 between the first intermediate planting unit 14 and second intermediate planting unit 16. With the top planter unit 18 installed s shown on FIG. 1 there is also a planting volume 136 between the top planter unit 18 and second intermediate planter unit 16. The central planting volume 140 comprised of the planting volumes 20 of base planting unit 12, planting volume 61 of first intermediate planting unit 14, planting volume 80 of second intermediate planting unit 16 and top planting volume 110 of top planting unit 18 extends from the top surface 106 of top planter unit 18 to the bottom member 24 in base planter unit 12 thereby allowing comparatively large, or deep rooted plants to be provided in the central planting volume 140 and smaller plants in the volumes 132, 134 and 136.

Figure 7:
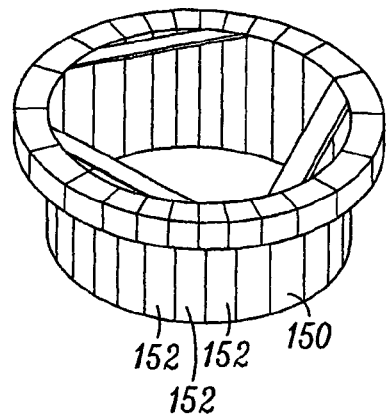
FIG. 7 illustrates a typical circular planting unit according to the principles of the present invention in the planting position thereof.

As noted above, the embodiments of the present invention may be fabricated in a variety of peripheral configurations. FIG. 7 illustrates a typical planter unit 150 which may one of a plurality of similar nesting planter units in accordance with the principles of the present invention as described above having a round peripheral shape and which may be fabricated of a plurality of vertically extending separate planks 152. The corner braces have been omitted from planter unit 150 for clarity.

Figure 8:
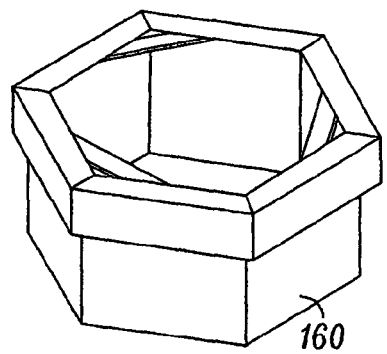
FIG. 8 illustrates a typical hexagonal planting unit according to the principles of the present invention in the planting position thereof.

FIG. 8 illustrates a typical planter unit 160 which may one of a plurality of similar nesting planter units in accordance with the principles of the present invention as described above having a hexagonal peripheral shape. The corner braces have been omitted from planter unit 160 for clarity.

Figure 9:
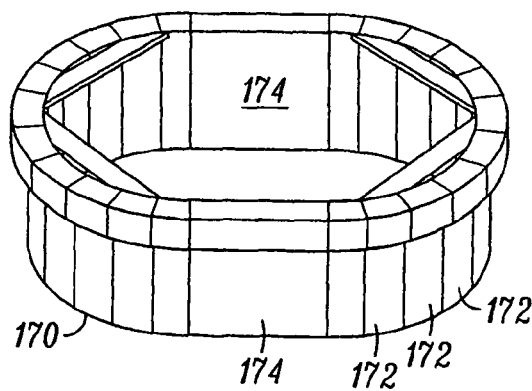
FIG. 9 illustrates a typical oval base planting unit according to the principles of the present invention according to the principles of the present invention in the planting position thereof.

FIG. 9 illustrates a typical planter unit 170 which may one of a plurality of similar planter units in accordance with the principles of the present invention as described above having an oval peripheral shape and which may be partially fabricated of a plurality of vertically extending separate planks 172 for the curved portions and extended planks 174 for the straight portion. The corner braces have been omitted from planter unit 170 for clarity.

Figure 10:
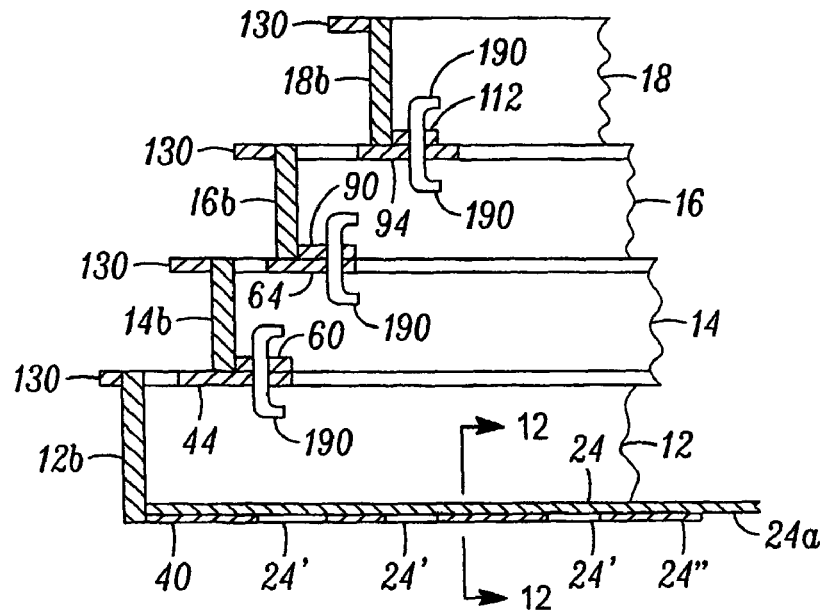
FIGS. 10 and 11 illustrate an alignment pin useful in the practice of the present invention and, FIG. 12 is a sectional view along the line 12-12 of FIG. 10 illustrating a support rim useful in the practice of the present invention.

In some applications of the present invention, it has been found desirable to provide a restraining device for holding the various planter units in alignment in the planting position thereof. FIG. 10 is a partial sectional view illustrating a restraining configuration. Each of the cross braces of each planting unit except the base planting unit is provided with walls defining a pin receiving aperture therethrough and each of the corner braces of each planting unit is provided with a pin receiving aperture therethrough in alignment with the apertures in the cross braces of the next lower planter unit. A pin 190 may be inserted into the aligned apertures to prevent the relative movement between adjacent planting units.

Figure 11:
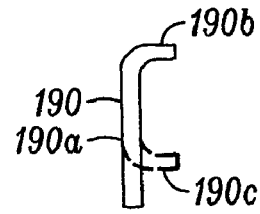
Figure 12:
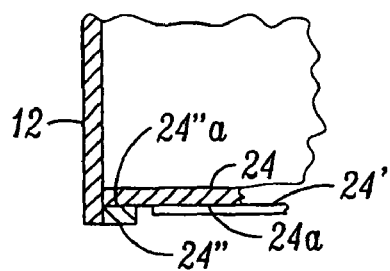

FIG. 11 illustrates the pin 190. As shown on FIG. 11, the pin 190 may be supplied with the pin 190 having a straight shank portion 190a and a "hooked" top portion 190b as shown in solid lines. After insertion as shown in FIG. 10, the bottom portion 190c may be bent into a hooked configuration as shown by the dashed lines in FIG. 11.

As noted above, the planter arrangement of the present invention may be fabricated from any suitable materials: wood planks, plastic, compressed wood, plywood light weight aluminum and the like. Further, various of the components in one planter arrangement may be fabricated from different materials: that is, in any one planter arrangement, some components may be fabricated from plastic, some from wood and the like as may be desired in particular applications.

Although specific embodiments of the present invention have been described above with reference to the various Figures of the drawing, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

What is claimed is:

1. An improved multi level planting arrangement comprising, in combination:

a base planter unit having a base planter unit side member having inner surfaces defining a base planter unit open planting volume therebetween and outer surfaces defining a first preselected geometric base planter unit peripheral configuration, and said base planter unit side member having a top surface and a bottom surface, and a movable bottom member positionable adjacent said top surface of said base planter unit side members in a storage position thereof and movable to a position adjacent said bottom surface of said base planter unit side members in a planting position thereof;

a first intermediate planter unit having a first intermediate side member and said first intermediate side member having a top surface and a bottom surface and an inner surface and an outer surface and said inner surface defining a first intermediate planting volume having an open top and an open bottom, and said outer surface of said first intermediate side member of said first intermediate planter unit defining a second preselected geometric peripheral configuration and sized to fit into said base planter unit open planting volume of said base planter unit in said storage condition and supported in a preselected alignment to provide said bottom surface of said first intermediate side member substantially co-planar with said top surface of said base planter unit side member in a planting position thereof and defining edge planting areas between said bottom surface of said first intermediate side member and said outer surface of said base planter unit side member in said planting position thereof; and, a first plurality of structural members for supporting said first intermediate planter unit in said preselected alignment with said base planter unit.

2. The arrangement defined in claim 1 and further comprising:

a second intermediate planter unit having a second intermediate side member and said second intermediate side member having a top surface and a bottom surface and an inner surface and an outer surface and said inner surface defining a second intermediate planting volume having an open top and an open bottom and said outer surface of said second intermediate side member of said second intermediate planter unit defining a third preselected geometric peripheral configuration and said second intermediate planter unit sized to fit into said first intermediate planter unit open planting volume in said storage condition and supported in a preselected alignment to provide said bottom surface of said second intermediate side member substantially co-planar with said top surface of said first intermediate planter unit side member in a planting position thereof and defining edge planting areas between said bottom surface of said second intermediate side member and said outer surface of said first intermediate planter unit side member in said planting position thereof;

a second plurality of structural members for supporting said second intermediate planter unit in said preselected alignment with said first planter unit in said planting position thereof.

3. The arrangement defined in claim 2 and further comprising:

a top planter unit having a top side member and said top side member having a top surface and a bottom surface and an inner surface and an outer surface and said inner surface defining a top planting volume having an open top and an open bottom and said outer surface of said top side member of said top planter unit defining a fourth preselected geometric peripheral configuration and said top planter unit sized to fit into said second intermediate planter unit open planting volume in said storage condition and supported in a preselected alignment to provide said bottom surface of said top side member substantially co-planar with said top surface of said second intermediate planter unit side member in a planting position thereof and defining edge planting areas between said bottom surface of said top side member and said outer surface of said second intermediate planter unit side member in said planting position thereof;

a third plurality of structural members for supporting said top planter unit in said preselected alignment with said second intermediate planter unit in said planting position thereof.

4. The arrangement defined in claim 3 wherein said third plurality of structural members comprises:

a plurality of second intermediate planter unit corner brace members each having an upper surface and a lower surface in a first preselected spaced apart relationship coupled to said side member of said second intermediate planter unit at said bottom surface of said side member, and a plurality of second intermediate planter unit cross brace members each having an upper surface and a lower surface coupled to said side member of said second intermediate planter unit adjacent said top surface of said second intermediate planter unit side member in a third preselected spaced apart array and spaced inwardly of said second intermediate planter unit side member to overlie said second intermediate planter unit planting volume and inwardly of said plurality of second intermediate planter unit corner brace members;

a plurality of top planter unit corner brace members each having an upper surface and a lower surface and coupled to said top planter unit side member in said second preselected array at said lower surface of said top planter unit side member to overlie said plurality of second intermediate planter unit cross brace members to provide said lower surface of said top planter unit corner brace members positionable on said upper surface of said second intermediate planter unit cross brace members.

5. The arrangement defined in claim 4 and further comprising:

a plurality of pin members insertable in said aligned apertures of said top planter unit corner brace members and said second intermediate planter unit cross brace members.

6. The arrangement defined in claim 4 and further comprising:

said bottom member in said base planter unit planting volume movable therein from a storage position resting on said lower surface of said base planter unit cross brace members to a planting position resting on said upper surface of said base planter unit corner brace members.

7. The arrangement defined in claim 6 and further comprising:

rim support members extending between said base planter unit corner brace members of said base planter unit around the bottom of said base planter unit and said rim support members have an upper surface; and said bottom member rests on said upper surface of said rim support members.

8. The arrangement defined in claim 2 wherein said second plurality of structural members comprises:

a plurality of first intermediate planter unit corner brace members each having an upper surface and a lower surface in a first preselected spaced apart relationship coupled to said side member of said first intermediate planter unit at said bottom surface of said side member, and a plurality of first intermediate planter unit cross brace members each having an upper surface and a lower surface coupled to said side member of said first intermediate planter unit adjacent said top surface of said first intermediate planter unit side member in a third preselected spaced apart array and spaced inwardly of said first intermediate planter unit side member to overlie said first intermediate planter unit planting volume and inwardly of said plurality of first intermediate planter unit corner brace members;

a plurality of second intermediate planter unit corner brace members each having an upper surface and a lower surface and coupled to said second intermediate planter unit side member in said second preselected array to overlie said plurality of first intermediate planter unit cross brace members to provide said lower surface of said second intermediate corner brace members positionable on said upper surface of said first intermediate planter unit cross brace members.

9. The arrangement defined in claim 8 and further comprising:
at least some of said plurality of first intermediate planter unit cross brace members have an aperture therethrough; and,
at least some of said plurality of said second intermediate planter unit corner brace members have an aperture therethrough alignable in said planting position with said apertures in said first intermediate planter unit cross brace members.

10. The arrangement defined in claim 9 and further comprising:
a plurality of pin members insertable in said aligned apertures of said second intermediate planter unit corner brace members and said first intermediate planter unit cross brace members.

11. The arrangement defined in claim 10 and further comprising:
at least some of said plurality of said second intermediate planter unit cross brace members have an aperture therethrough; and,
at least some of said plurality of said top planter unit corner brace members have an aperture therethrough alignable in said planting position with said apertures in said second intermediate planter unit cross brace members.

12. The arrangement defined in claim 10 wherein:
at least some of said pin members have a hooked top portion and a hooked bottom portion.

13. The arrangement defined in claim 8 and further comprising:
said bottom member in said base planter unit planting volume movable therein from a storage position resting on said lower surface of said base planter unit cross brace members to a planting position resting on said upper surface of said base planter unit corner brace members.

14. The arrangement defined in claim 13 and further comprising:
rim support members extending between said base planter unit corner brace members of said base planter unit around the bottom of said base planter unit and said rim support members have an upper surface; and
said bottom member rests on said upper surface of said rim support members.

15. The arrangement defined in claim 1 wherein said first plurality of structural members comprises:
a plurality of base planter unit corner brace members each having an upper surface and a lower surface in a first preselected spaced apart relationship coupled to said side member of said base planter unit at said bottom surface of said side member, and a plurality of base planter unit cross brace members each having an upper surface and a lower surface coupled to said side member of said base planter unit adjacent said top surface of said base planter unit side member in a second preselected spaced apart array and spaced inwardly of said base planter unit side member to overlie said base planter unit planting volume and inwardly of said plurality of base planter unit corner brace members;
a plurality of first intermediate planter unit corner brace members each having an upper surface and a lower surface and coupled to said first intermediate planter unit side member in said second preselected array to overlie said plurality of base planter unit cross brace members to provide said lower surface of said first intermediate corner brace members positionable on said upper surface of said base planter unit cross brace members.

16. The arrangement defined in claim 15 and further comprising:
at least some of said plurality of base planter unit cross brace members have an aperture therethrough; and,
at least some of said plurality of said first intermediate planter unit corner brace members have an aperture therethrough alignable in said planting position with said apertures in said base planter unit cross brace members.

17. The arrangement defined in claim 16 and further comprising:
a plurality of pin members insertable in said aligned apertures of said first intermediate planter unit corner brace members and said base planter unit cross brace members.

18. The arrangement defined in claim 15 and further comprising:
said bottom member in said base planter unit planting volume movable therein from a storage position resting on said lower surface of said base planter unit cross brace members to a planting position resting on said upper surface of said base planter unit corner brace members.

* * * * *